Figure 1:
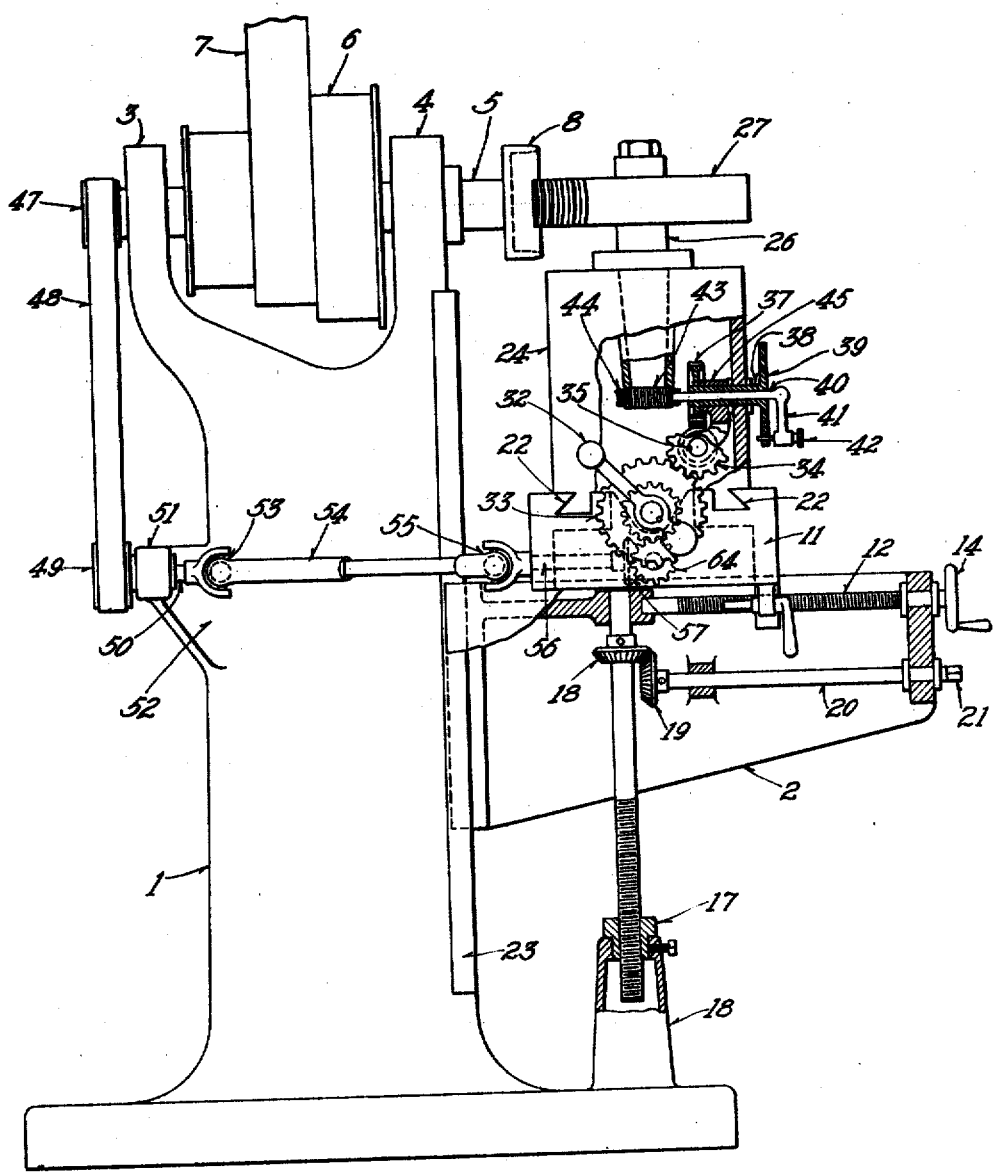

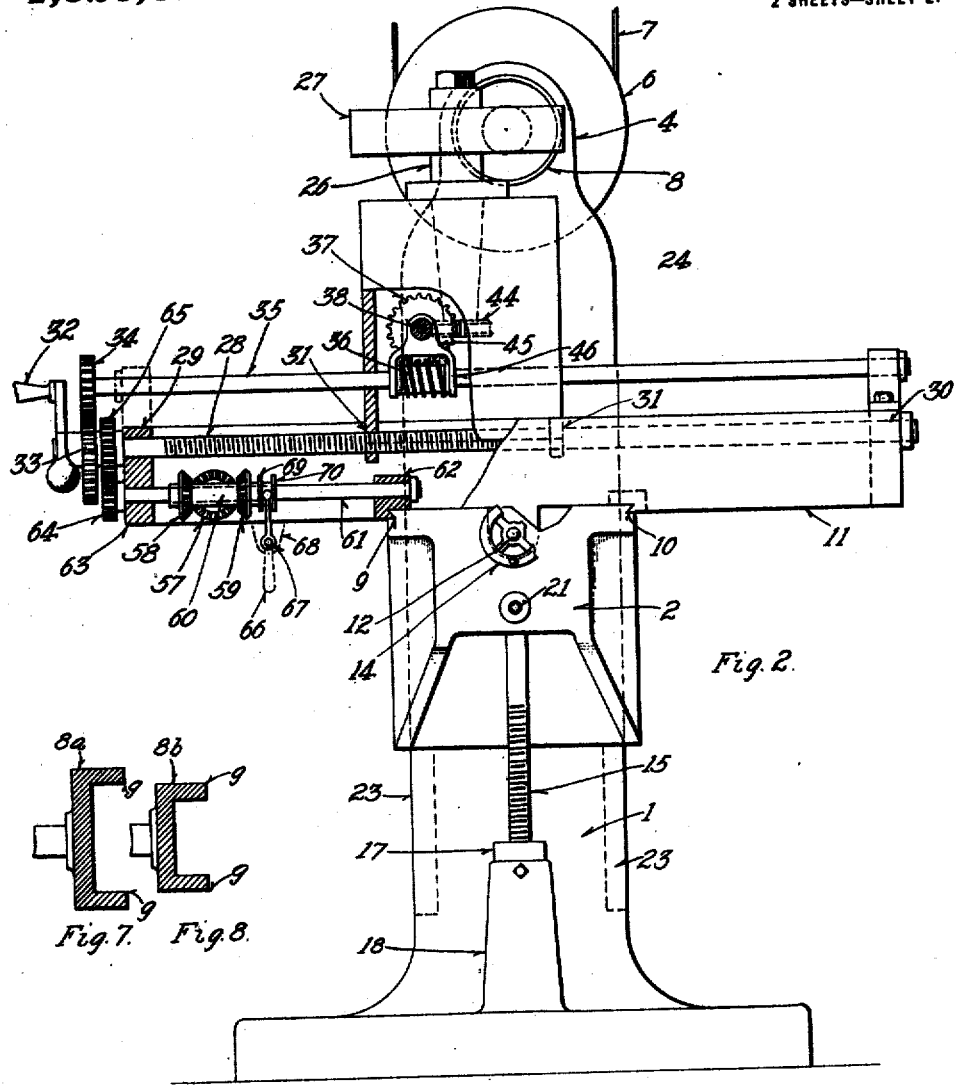

UNITED STATES PATENT OFFICE.

JOSEPH C. O'BRIEN, OF PITTSBURGH, PENNSYLVANIA, ASSIGNOR, BY MESNE ASSIGNMENTS, TO GLEASON WORKS, OF ROCHESTER, NEW YORK, A CORPORATION OF NEW YORK.

GEAR-CUTTING MACHINE.

1,326,610.   Specification of Letters Patent.   Patented Dec. 30, 1919.

Application filed December 29, 1914. Serial No. 879,505.

*To all whom it may concern:*

Be it known that I, JOSEPH C. O'BRIEN, a citizen of the United States, and a resident of Pittsburgh, in the county of Allegheny and State of Pennsylvania, have invented a new and useful Improvement in Gear-Cutting Machines, of which the following is a specification.

My invention relates to toothed gears and to apparatus for producing them, and it has special reference to gears which are provided with generated teeth that are of non-rectilinear contour, particularly teeth of continuously curved contour across the face of the gear.

One object of my invention is to provide a novel, expeditious and accurate apparatus for generatively forming teeth of the above-indicated character upon gear blanks of various kinds, such as wheels, pinions, miters and racks.

Another object of my invention is to provide toothed wheels and other gears of the above-indicated form having novel and advantageous properties that adapt them for high-speed service and for use in the transmission of heavy loads.

Of the accompanying drawings, Figure 1 is an end elevational view, with parts shown in section, of a machine adapted to carry out my process; Fig. 2 is a front elevational view of the machine illustrated in Fig. 1, with parts broken away; Figs. 3, 4, 5 and 6 are diagrammatic plan views showing the coöperative relations between a cutting tool and a gear blank at four successive stages of my process, and Figs. 7 and 8 are diametral sectional views showing a pair of cutting tools adapted for carrying out one modification of my process.

Ordinary straight-toothed gears, in which the meshing teeth engage each other along their full lengths simultaneously, have certain well known disadvantages that render them unsuitable for the transmission of power at high speeds. Among these disadvantages are noisy and destructive jarring, unequal tooth strength at different parts of the tooth and the fact that only one or two of the teeth of each gear can be in service at one time. These objections are overcome in the familiar herringbone gears, but such gears cannot be machined successfully without providing a central groove in the face of the gear blank to allow sufficient clearance for the cutting tool.

The first gear wheels made with curved teeth were cast and were of very limited utility on account of the relative inaccuracy and weakness of cast gear teeth. Later, it was proposed to machine such gears by sweeping a formed cutting tool across the face of a gear blank and imparting to the gear blank a tilting movement along a line passing through the tooth space being cut. This process, however, does not produce gears that will mesh with even approximate correctness because the tooth spaces so produced are unsymmetrical and the tilting of the gear blank serves to correct such lack of symmetry at only one point in the tooth curve, that is to say, at the point at which the axis of symmetry of the path of the cutting tool coincides with a diameter of the gear blank. The tilting of the blank has the further disadvantage that it causes a sharp break at about the middle line of the curve of each tooth face, an excessive amount of metal being cut away above and below this line. For these reasons, gear wheels cut by the process just described will not transmit uniform angular velocity.

If a cutting tool is associated with a gear blank in such a manner that the tool and the blank have a mutual rolling movement similar to that which takes place between a coöperating rack and pinion, the cutting tool will generate accurate gear teeth in the blank.

According to my present invention, I apply this principle to the cutting of non-rectilinear gear teeth by causing a cutting tool to sweep in a curved or other non-rectilinear path across the face of a gear blank and simultaneously imparting to the blank a generating movement; that is to say, blank a movement which determines the outline of the gear tooth being cut. When generated gears are mentioned herein, I desire to be understood as referring to gears in which the tooth form results from a mutual movement between the gear blank and the cutting tool during the cutting operation. In the specific modification of my invention which I shall describe in detail, a rotary hollow milling tool is brought into cutting engagement with the face of a gear blank which is rotatably supported upon an axis perpendicular to the axis about which the cutting tool rotates.

In order that the slots between the teeth may be uniform in depth from end to end, I impart to the cutting tool and to the blank a bodily rolling movement with respect to each other during the operation of cutting each tooth. Thus, if the cutting tool rotates about a horizontal axis and the blank is supported upon a vertical axis, I may cause the blank to simultaneously rotate and to move bodily past the cutting tool while in cutting engagement therewith, this rolling movement of generation being similar to the relative movement which takes place between a coöperating pinion and stationary rack. The movement of the gear blank is analogous to that of the pinion, and the cutting tool coöperates with the gear blank in the manner of a rack tooth.

After each tooth is generated in the manner just described, the blank is withdrawn from engagement with the tool and returned to its initial position, given an indexing rotation, and again brought into engagement with the rotating tool. A four-way bodily movement is thus imparted to the blank as each tooth is cut.

An equally effective modification of my process consists in bodily moving the cutting tool instead of the blank. In this case, the blank rotates without bodily movement and the rotary tool is given a four-way bodily movement, during the cutting of each tooth, similar to the four-way movement imparted to the gear blank in the first form of the process above described. In both forms, the speed of translation of the blank or of the tool during the cutting operation is made equal to the speed at which the gear blank rotates, measured upon the circumference of its pitch circle or upon that of its base circle, depending upon whether the blank is cut with reference to the pitch circle or to the base circle. The result is that, if the blank or the tool moves bodily a distance equal to the circumference of the pitch circle or to that of the base circle of the blank, as the case may be, the blank will have completed one revolution.

For a better understanding of my invention, reference may now be had to the accompanying drawing, which illustrates a machine adapted to carry out the form of my process in which the rotary milling tool is not bodily movable, while the blank both rotates and performs the four-way bodily movement above described.

The machine illustrated in Figs. 1 and 2 is essentially a milling machine of a well known type, having a horizontal cutting spindle and a reciprocating work-holding bed. It consists of a standard 1 carrying, at one side, a vertically adjustable bracket 2 and provided, near its upper end, with bearings 3 and 4 in which is mounted a spindle 5 that carries a cone pulley 6, with which a driving belt 7 is adapted to coöperate to rotate the spindle 5. The spindle 5 carries, at its outer end, a circular hollow milling tool 8, the radius of which corresponds to the radius of the teeth to be cut. The milling tool 8 may conveniently be composed of a number of removable cutting tools set in a circular holder, and together presenting the appearance shown in Fig. 1.

Mounted in transverse ways 9 and 10 on the bracket 2, is an elongated bed 11, which is adapted to be moved toward and from the standard 1 by means of a screw shaft 12 which coöperates with a screw-threaded projection depending from the bed 11 and is adapted to be turned by means of a hand wheel 14. The bracket 2 and the bed 11 may be adjusted vertically along guides 23 in the standard 1 by means of a screw 15 that coöperates with a stationary nut 17 held in a projection 18 of the standard 1. The screw 15 is adapted to be turned by means of coöperating miter gear wheels 18 and 19, the gear wheel 19 being secured to one end of a horizontal spindle 20 that is provided with a squared end 21, to which a wrench may be applied.

The bed 11 is provided with longitudinal slots 22 in which a head stock 24 is adapted to move. The head stock 24 is provided with bearings for supporting a vertical spindle 26 that is adapted to support a gear blank 27 in operative relation to the cutting tool 8.

Means are provided for causing the head stock 24 to travel lengthwise upon the bed 11 and for simultaneously causing the blank-supporting spindle 26 to rotate. As shown, such means comprises a screw shaft 28, the ends of which are supported in bearings 29 and 30 in the bed 11 and which engages screw-threaded openings 31 in the head stock 24. The screw shaft 28 is provided, at the operating end of the machine, with a crank 32. It will be obvious that, when the screw shaft 28 is turned by means of the crank 32, the head stock 24 will be caused to move longitudinally upon the bed 11.

To the screw shaft 28, near the crank 32, is secured a spur gear wheel 33 to mesh with a spur gear wheel 34 that is secured to one end of a spindle shaft 35 which is disposed parallel to the screw shaft 28 and somewhat above it and to the right, as seen in Fig. 1. Feathered upon the shaft 35 is a worm pinion 36 to mesh with a worm wheel 37 that is secured to the inner end of a short hollow shaft 38, which is rotatably mounted in a bearing in the wall of the head stock 24 and carries, at its outer end, an indexing plate 39. A shaft 40 extends through the short hollow shaft 39 and carries, at its outer end, a crank 41 that is provided with a spring-pressed pin 42 to coöperate with perforations in the indexing plate 39, in the manner customary in machines of this character. The inner end of the shaft 40 carries a worm 43 to mesh with a worm wheel 44 that is secured to the lower end of the blank-carrying spindle 26. The worm 36 and the worm wheel 37 are maintained in fixed relation to each other by means of a yoke 45 which loosely surrounds the hollow shaft 38 and is provided with downwardly-extending apertured arms 46 that surround the shaft 35 adjacent to the ends of the worm 36. This arrangement causes the worm 36 to move with the head stock 24 when the head stock is moved by means of the screw shaft 28.

In order that the head stock 24 may be automatically reciprocated along the bed 11, I provide means for rotating the screw shaft 28 by power derived from the pulley shaft 5. Secured to the outer end of the shaft 5 is a pulley 47 over which passes a belt 48 that also passes over a pulley 49 secured to a short shaft 50 which is rotatably mounted in a bearing 51 in a bracket 52 formed in the standard 1. At the end of the short shaft 50 that is opposite the pulley 49 is a universal joint 53 which serves to connect the shaft 50 to a telescoping shaft 54. The other end of the telescoping shaft 54 is connected, by means of a universal joint 55, to one end of a short shaft 56 which carries, at its other end, a miter gear wheel 57 that is adapted to mesh with either one of a pair of miter gear wheels 58 and 59. The miter gear wheels 58 and 59 are both mounted upon a sleeve 60 that is slidably keyed to a shaft 61 which is rotatably disposed in bearings 62 and 63 in the bed 11 and carries, at its outer end, a gear wheel 64 that meshes with a gear wheel 65 secured to the screw shaft 28. The universal joints 53 and 55 and the telescoping shaft 54 render it possible to adjust the bed 11 vertically and laterally without disturbing the train of gearing just described.

The miter gear wheels 58 and 59 are so spaced apart upon the sleeve 60 that either of them may mesh with the driving miter gear wheel 57, while, in a mid-position, shown in Fig. 2, neither of the gear wheels 58 and 59 meshes with the gear wheel 57. For the purpose of shifting the sleeve 60 along the shaft 61, I provide a shifting lever 66 which is pivoted at 67 to a projection 68 depending from the bed 11. The end of the lever 66 enters a groove formed by spaced flanges 69 and 70 on the sleeve 60.

It will be readily understood that the train of gearing just described provides for the rotation of the gear blank and for its simultaneous bodily translation. The relative proportions of the gear wheels are so selected that, when the blank has moved bodily a distance equal to its pitch circumference, or to the circumference of its base circle, if the gear teeth are to be cut with reference to the base circle, it will have completed one revolution.

The manner in which my process is carried out with the machine described above may be best understood by referring to Figs. 3 to 6, inclusive, which show diagrammatically the relative positions of the cutting tool 8 and of the gear blank 27 at four successive stages of the process. The gear blank to be cut is first secured to the spindle 26 in such a manner that the axis of the cutting tool coincides with the median plane of the gear blank. The shifting lever 66 being in the mid-position shown in Fig. 2, the crank 32 is operated to move the head stock 24 lengthwise upon the bed 11 until the blank is in the position shown in Fig. 3 with relation to the cutting tool 8. The bed 11 is then moved laterally by means of the hand wheel 14, thereby moving the gear blank in the direction of the arrow $a$, Fig. 3, until it reaches the position shown in Fig. 4, in which the cutting tool is nearly in engagement with the face of the gear blank, and the ends of the teeth of the cutting tool are in a plane tangent to the root circle of the gear blank. Power is then applied to the pulley 6 by means of the belt 7 and the shafts 5, 50, 54 and 56 are thereby rotated. The shifting lever 66 is then operated to cause one of the miter gear wheels 58 and 59 to mesh with the driving miter gear wheel 57, and thereby to rotate the screw shaft 28 in the proper direction to move the head stock 24 past the rotating cutting tool 8. A movement of translation in the direction of the arrow $b$ is thus imparted to the blank, and the blank is simultaneously rotated in the direction of the arrow $c$, Fig. 4. The blank may, if desired, be brought into engagement with the cutting tool from the right, as seen in Figs. 2, 3 and 4, instead of from the left. In this case, the movements of the blank will be reversed.

The simultaneous rotation and translation of the blank are continued until these parts are in the relative positions shown in Fig. 5, in which is also shown a tooth-space 75 which has been generated by the mutual rolling movement of the blank and the cutting tool. A further movement of translation of the blank would result in engagement with the opposite side of the cutting tool 8, and the movement of the blank is therefore stopped at this point by moving the shifting lever 66 to its mid-position. The blank-carrying structure is withdrawn from the cutting tool in the direction of the arrow $d$, Fig. 5, by means of the hand wheel 14, until the blank is completely removed from the cutting tool, as shown in Fig. 6. By moving the shifting lever 66 in the direction opposite to that which started the working stroke of the machine, reverse rotation is imparted to the shafts 61 and 28, and the head stock is thereby moved in the direction of the arrow $e$, Fig. 6, until the blank reaches its starting position, shown in Fig. 3. During this return movement of translation, the blank is caused to rotate in the direction of the arrow $f$, Fig. 6, to the angular position which it occupied when the machine was started. The blank is then indexed by means of the indexing crank 41, and the cycle of operations is again begun for cutting the next tooth, the position of which is indicated in dotted lines at 76, Fig. 6.

When a cut has been made for each tooth space of the gear blank, the cutting tool 8 should be replaced by another cutting tool, the interior radius of which is equal to the external radius of the first cutting tool used, in order that both the concave and convex faces of the gear teeth shall have equal radii. This method of cutting with two cutting tools produces gears that are adapted to mesh with one another interchangeably. It is, however, possible to cut a pair of gears that will mesh accurately by cutting one of them with a single cutting tool and cutting the teeth on the other with two cutting tools of unequal radii corresponding, respectively, to the inner and outer radii of the single tool with which the first gear was cut. This method is economical in cases where, for example, a large gear wheel is to mesh with a small pinion, the large wheel being cut with a single cutter, and the pinion, which has fewer teeth, being shaped accordingly with two cutters. In practice, it is frequently desirable to use a third cutting tool for roughing out the tooth spaces, which are then finished by means of accurate finishing cutters of the proper radii.

According to my process, teeth having various degrees of curvature may be cut upon blanks of various diameters. The minimum diameter of the cutting tool that can be used with a given gear blank is determined by the diameter of the blank, since the cutting tool must clear the chord tangent to the root circle of the tooth at the edge of the face of the blank, as shown in Fig. 5. The breadth of the face of the blank is limited by the diameter of the cutting tool.

The foregoing description relates particularly to gear teeth cut with reference to the pitch line of the gear. If the cutting tool is of the form shown in Fig. 1, the teeth produced are of exact involute form at the tooth centers and vary progressively from this to a hyperbolic form at the ends of the teeth. This variation from the true involute shape is exceedingly small and causes no difficulty in the operation of the gears, especially because, in a pair of meshing gears, the slight deviations from true involute form in the two meshing members neutralize each other and produce the effect of a pair of true involute gears. If, however, gear teeth of true involute form are desired, I prefer to employ a pair of cutting tools $8^a$ and $8^b$ of the form shown in Figs. 7 and 8, and to cut the teeth with reference to the base line of the gear blank. In this case, only the points $g$ of the cutting tools perform the cutting operation. If gear wheels are to be cut, the cutting tool and the blank are so associated that the face of the cutting tool is tangent to the base circle of the blank. In this modification of my process, the cutting operation must be stopped before the cutting tool has rolled completely through the blank, in order that too much of the concave side of the tooth space may not be cut away. If the base circle of the gear blank coincides with its root circle, this process produces gear teeth that are of true involute form in all their parts. If the base circle and the root circle do not coincide, the tooth spaces will be deeper in the center than at the ends, but, from the tops of the teeth to their effective roots, they are of true involute form.

While I have described a process in which the gear blank is moved in order to effect the generation of the gear teeth, it is to be understood that my process is not restricted to this form, but includes as well the modification in which the tool is both rotated and bodily moved, while the gear blank rotates during the cutting operation. These two forms accomplish identical results, since the relative movement between the tool and the blank is the same in both cases. It is also obvious that the spindles which support the tool and the blank may not be horizontal and vertical, respectively, but may occupy any desired positions, so long as their relative position and movement remain the same. In view of the numerous modifications of which my invention is capable, I desire that it be restricted only by such limitations as are indicated in the appended claims.

I claim as my invention:

1. In a gear cutting machine, the combination with a cutter, of a bed, a head stock movable longitudinally of the bed, a blank spindle mounted on said head stock, means operating to move the head stock longitudinally of the bed for traversing a blank past said cutter, and means for rotating the blank during such traversing motion comprising a worm mounted on the head stock and operatively connected with said blank spindle to turn the same, said worm being movable with the head stock, and a rotary shaft upon which the worm is feathered to permit relative sliding movement between the worm and the shaft and to drive said worm from the shaft.

2. In a gear cutting machine, the combination with a cutter, of a bed, a head stock movable longitudinally of the bed, a blank spindle mounted on said head stock, means operating to move the head stock longitudinally of the bed for traversing a blank past said cutter, and means for rotating the blank during such traversing motion comprising a worm mounted on the head stock and geared to the blank spindle, a worm gear also mounted on the head stock and rotatable with said worm, a second worm in engagement with said worm gear, and a rotary shaft for driving the last mentioned worm, the latter worm being slidable upon said shaft with the head stock.

In testimony whereof I have hereunto subscribed my name this 22nd day of Dec., 1914.

JOSEPH C. O'BRIEN.

Witnesses:
R. T. MILLER,
B. B. HINES.